Patented June 6, 1933

1,912,734

UNITED STATES PATENT OFFICE

CYRIL J. STAUD AND THOMAS F. MURRAY, JR., OF ROCHESTER, NEW YORK, ASSIGNORS TO EASTMAN KODAK COMPANY, OF ROCHESTER, NEW YORK, A CORPORATION OF NEW YORK

PHTHALIC ACID ESTERS OF MONOETHERS OF HYDROQUINONE

No Drawing.   Application filed July 29, 1932.  Serial No. 626,217.

This invention relates to phthalic acid esters of monoethers of hydroquinone. An object of our invention is to provide phthalic acid esters wherein each of the carboxyl groups of the phthalic acid is esterified by a monoether of hydroquinone. Another object of our invention is to provide a process of making these esters.

We have discovered that phthalic acid esters of monoethers of hydroquinone, such, for instance, as the phthalic acid ester of the monomethyl ether of hydroquinone and the phthalic acid ester of the monobenzyl ether of hydroquinone, wherein both carboxyl groups of phthalic acid are esterified by the ether of hydroquinone, may be prepared by heating the ether of hydroquinone with phthalyl chloride. It is preferable to use approximately two molecular proportions of the ether of hydroquinone to one molecular proportion of phthalyl chloride. The temperature used should not be high enough to cause appreciable decomposition of the starting materials or of the product. As a rule, the temperature of the steam bath is suitable. In order to obtain a good yield, heating should be continued as long as hydrogen chloride is evolved. In some cases, as in the preparation of the phthalic acid ester of the monobenzyl ether of hydroquinone, it is desirable to carry out the reaction in the presence of a solvent or diluent, such, for instance, as toluene.

Our novel esters are useful as ultra-violet light filters in cellulose acetate compositions. Such compositions are claimed in our copending application Serial No. 626,218, filed of even date herewith.

As examples of the method of carrying out our invention, we shall describe the preparation of the phthalic acid ester of the monomethyl ether of hydroquinone and of the phthalic acid ester of the monobenzyl ether of hydroquinone. We have found that it is immaterial whether the phthalyl chloride used is the symmetrical or the unsymmetrical modification, the same product being obtained in either case. The monomethyl and monobenzyl ethers of hydroquinone have been described in the literature.

*Preparation of the phthalic acid ester of the monomethyl ether of hydroquinone.*—20 grams of phthalyl chloride and 25 grams of the monomethyl ether of hydroquinone are heated together on a steam bath until no more hydrogen chloride is evolved. A red, oily liquid results which crystallizes on standing for about 36 hours. This consists principally of the phthalic acid ester of the monomethyl ether of hydroquinone, which has the structural formula:

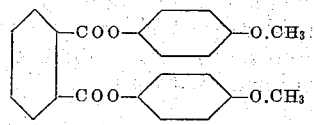

It may be purified by dissolving in 450 cc. of 95% ethyl alcohol and filtering with the aid of activated charcoal. When the filtrate is cooled, crystals separate out, which may be further purified by again recrystallizing from alcohol. The final product has a melting point of 93° C., is very soluble in acetone and practically insoluble in ligroin.

*Preparation of the phthalic acid ester of the monobenzyl ether of hydroquinone.*—20 grams of phthalyl chloride and 40 grams of the monobenzyl ether of hydroquinone, together with some toluene as a solvent, are heated on a steam bath for about 18 hours, or until hydrogen chloride ceases to be evolved. On cooling, crystals of the phthalic acid ester of the monobenzyl ether of hydroquinone separate. After being washed with toluene and dried, the white crystals melt at 144–145° C. The structural formula of the product is

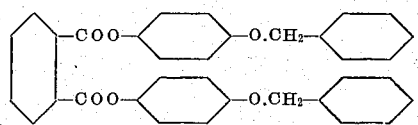

It will be understood that in the above examples the quantities may be varied, and that the times and temperatures given are only approximate, and may be varied to suit conditions.

While we have described the preparation of the phthalic acid esters of the monomethyl and monobenzyl ethers of hydroquinone, it will be obvious that our invention is not limited to the esters of these particular ethers. The phthalic acid esters of other monoalkyl or monoaryl ethers of hydroquinone, such, for instance, as the phthalic acid esters of the monoethyl and monophenyl ethers of hydroquinone may also be prepared by our process, and are included within the scope of our invention.

What we claim as our invention and desire to be secured by Letters Patent of the United States is:

1. Phthalic acid esters wherein both carboxyl groups of the phthalic acid are esterified by a monoether of hydroquinone.

2. Phthalic acid esters wherein both carboxyl groups of the phthalic acid are esterified by a monoalkyl ether of hydroquinone.

3. Phthalic acid esters wherein both carboxyl groups of the phthalic acid are esterified by a monoaryl ether of hydroquinone.

4. A process of preparing phthalic acid esters wherein both carboxyl groups of the phthalic acid are esterified by a monoether of hydroquinone, comprising heating phthalyl chloride with a monoether of hydroquinone.

5. A process of preparing phthalic acid esters wherein both carboxyl groups of the phthalic acid are esterified by a monoalkyl ether of hydroquinone, comprising heating phthalyl chloride with a monoalkyl ether of hydroquinone.

6. A process of preparing phthalic acid esters wherein both carboxyl groups of the phthalic acid are esterified by a monoaryl ether of hydroquinone, comprising heating phthalyl chloride with a monoaryl ether of hydroquinone.

Signed at Rochester, New York, this 22nd day of July 1932.

CYRIL J. STAUD.
THOMAS F. MURRAY, Jr.